United States Patent [19]

Visser

[11] Patent Number: 4,890,912

[45] Date of Patent: Jan. 2, 1990

[54] TRIFOCAL EYE-CONTACT LENS

[76] Inventor: Rients Visser, Twaalf Apostelenweg 8, 6524LW Nijmegen, Netherlands

[21] Appl. No.: 229,787

[22] Filed: Aug. 9, 1988

Related U.S. Application Data

[63] Continuation of Ser. No. 822,895, Jan. 24, 1986, abandoned.

[51] Int. Cl.⁴ .................................................. G02C 7/04
[52] U.S. Cl. .................................................... 351/161
[58] Field of Search ............... 351/160 R, 160 H, 161, 351/162

[56] References Cited

U.S. PATENT DOCUMENTS

Re. 25,286 11/1962 DeCarle .............................. 351/161
3,270,099 8/1966 Camp ............................... 351/161 X
3,614,217 10/1971 Bronstein ............................. 351/161

OTHER PUBLICATIONS

Stone, J. et al; "Contact Lenses"; (Butterworths, Second Edition, 1981/1982); pp. 571–573 and 588–590.

Primary Examiner—Scott J. Sugarman
Attorney, Agent, or Firm—Rosen, Dainow & Jacobs

[57] ABSTRACT

A contact lens includes a central part, confined by the brims of a bowl-shaped recess at the inside/concave side of the lens, a brim-part around the periphery of the lens, having at the outside convex of the lens a surface with a smaller radius than that of the surface of the inner part and having a thickness which from the inside to the outside decreases gradually, an intermediate part situated between the central part and the brim-part, the surfaces of which, both at the inside and at the outside of the intermediate part smoothly connect the surfaces of the central part and the brim-part.

3 Claims, 2 Drawing Sheets

| PART | SURFACE | RADIUS OF CURVATURE |
|---|---|---|
| CENTRAL (4) | INNER (10) | SHORTER THAN OUTER (11) |
|  | OUTER (11) | LONGER THAN INNER (10) |
| BRIM (6) | INNER (12) | LONGER THAN OUTER (13) |
|  | OUTER (13) | SHORTER THAN INNER (12) |

TRIFOCAL EYE-CONTACT LENS

This application is a continuation, of application Ser. No. 822,895, filed Jan. 24, 1986 now abandoned.

BACKGROUND OF THE INVENTION

This invention relates to an eye-contact lens, consisting of mainly concentric parts, having mutually different focal distances.

Such types of lenses are generally well known. For instance lenses are known for correcting the course of light rays to the eye in cases of presbyopia, having at their convex outer surface a brim-part, ground for correcting rays in case of myopia. The surface of the brim-part, being part of the outer surface of the lens then has a smaller radius than the part of the outer surface it surrounds, the central part, while the thickness of the brim-part gradually decreases towards the edge of the lens. Also other eye-contact lenses are known for correcting the course of rays in case of myopia, provided with a bowl-shaped recess in the concave inner surface for correction of presbyopia.

These known bifocal lenses however have their disadvantages. More particularly, a sharp image is only obtained for two distance-intervals, whereas the transition from far-sight to short-sight is a discontinuous one and is considered an inconvenience.

Some have tried to overcome the said disadvantages of designing multi-focal lenses, where the power of the lens changes gradually from the middle part of the lens towards the edge thereof. This however entails a disadvantage, in that because of the changing power, an optimally sharp image on the retina is never obtained.

Due to increasing demand for bifocal contact lenses and the disappointing results with current concepts such as the mentioned crescent and concentrical shapes, a new concept, the bi-trifocal contact lens was developed in our office.

The eye-contact lens according to the present invention avoids the disadvantages of the bifocal lens and of the multi-focal lenses. To that end, the eye-contact lens according to the present invention consists of at least three parts:
 a central part, confined by the brims of a bowl-shaped recess at the inside/concave side of the lens;
 a brim-part around the periphery of the lens, having at the outside or the convex side of the lens, a surface with a radius which is smaller than that of the surface of the inner part and having a thickness which from the inside to the outside decreases gradually; and
 a part, situated between the central part and the brim-part, the surfaces of which, both at the inside and at the outside of the lens, connect the surfaces of the central part and the brim-part.

The brim-part and the middle part in most of these lenses are concentric with respect to the central part.

Thus it is possible and it is an object to provide one lens, to correct both for presbyopia and for myopia. Therefore the part-in-between obtains good image-forming characteristics for the distance interval between 'close by' and 'far off'. A further positive contribution is that it makes the transition from long distance to short distance, a gradual one thus avoiding the earlier mentioned inconvenience for the user.

BRIEF DESCRIPTION OF THE DRAWINGS

The invention will be further explained by means of the drawing, which by way of example schematically shows a lens according to the invention where.

DESCRIPTION OF THE PREFERRED EMBODIMENT

Figure 1:
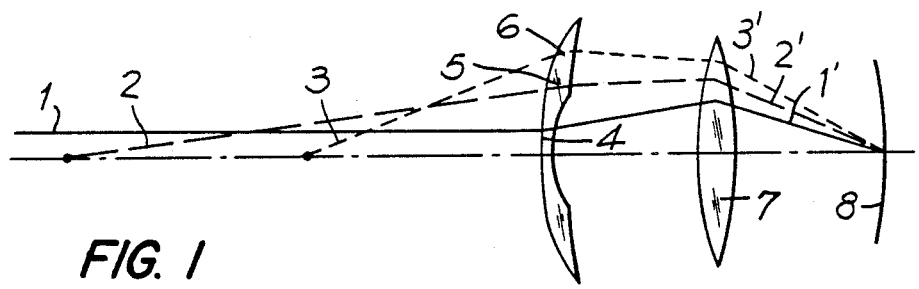
FIG. 1 shows how a sharp image is obtained on the retina of the eye by light rays, reaching the retina via the three parts of the lens and via the eye-lens.

The rays 1, 3 and 2, coming from respectively, far away, close-by or near, and from somewhere in-between, are corrected by lens-parts 4, 6 and 5 such, that via the eye-lens 7 and the continued rays 1', 3' and 2' on the retina 8, a sharp image is obtained.

In practice it has been discovered that optimal results are obtained if, measured in the radial direction, the width 19 of the part 5 situated between the central part 4 and the brim-part 6, is 0.3–0.5 mm, and preferentially 0.4 mm.

The bi-trifocal concept of the present invention uses a so called "simultaneous principle". This means that far or distant vision, the distance part and for near vision, the near part of the lens covers the poupil for at leat two-thirds thereof.

The reading part 6 and the intermediate part 5 are located concentrically around the distant vision part 4. This design is special because the reading addition (near add) is divided between the front and backside of the lens. Therefore, the lens is cut such that the distance power + half the reading add is divided by 2, [(distance power + near power)/2]. Half of the reading add (a negative number) is then cut into the backside of the lens. This means that a distance part 4 is created (FIG. 2) which, together with a tearlens or tearfilm, corrects the vision for distance.

Next, the other half of the near add number is cut onto the frontside of the lens. Therefore, the near part and the intermediate part are concentrically created.

Working with the lens in practice has showed us that the intermediate distance part is seldom needed. Since the near add is less than two diopters, no intermediate distance jpart is "effectively" needed. It should be pointed out that this bi-trifocal contact lens can be made in hard pmma and hard oxygen permeable materials, as long as there is enough difference between the optical breaking index of the lens material and the tearfilm.

Finally, since the sagittal depth of the distance part at the backside of the lens is only maximally 0.02 millimeters, no problems will occur in the judging or selection of a fluorescein pattern.

Figure 2:
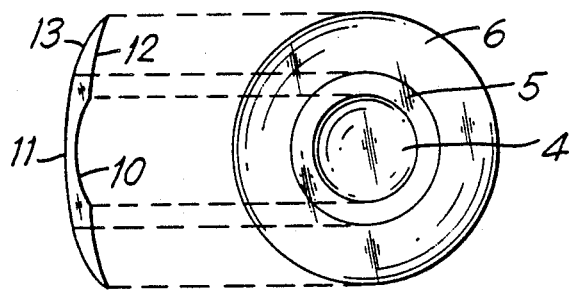
FIG. 2 shows a front-view of and a cross section through a lens according to the invention.
Figures 3, 4:
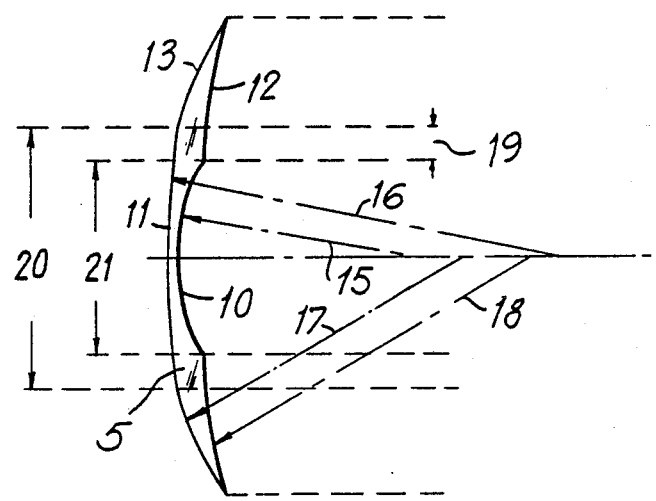
FIG. 3 is a table relating the surfaces of the lens parts by their radii of curvature.
FIG. 4 is an enlarged cross-section of the lens of FIG. 2 for illustrating surfaces and their radii.

As will be observed from FIGS. 2–4, the center concave part back surface is designated 10, the front surface opposite is designated 11, the front surface of the brim part 5 is designated 13 and the opposite back surface thereof is designated 12. As is explained above, the respective radii of curvature are chosen as indicated in the table of FIG. 3, with the inner surface 10 at the center having, as shown in FIGS. 2–4, a shorter radius 15 than that 16 of the outer surface 11, and with the outer brim surface 13 having a shorter radius 17 than that 18 of the inner brim surface 12. The radii shown are schematic and not to scale. As will also be noted from the lens cross-section, the diameter 20 of the front surface 11 overlaps the inner diameter 21 of the inner brim surface 12 thereby forming the transitional part 5.

I claim:

1. An eye-contact lens composed of one optical material and comprising three mainly-concentric parts including a central part (4) for distance or far vision, an outer or brim part (6) for near or reading vision, and a transitional part (5) extending between the central and outer parts and connecting together their inner and outer surfaces, said three parts having different focal distances, said central part having an inner concave surface (10) and an outer convex surface (11), said brim part having an annular inner concave surface (12) and an annular outer convex surface (13), the radius of curvature of the central inner surface (10) being shorter than the radius of curvature of the central outer surface (11), the radius of curvature of the brim outer surface (13) being shorter than the radius of curvature of the brim inner surface (12), said central part (4) having a thickness measured between its inner (10) and outer (11) surfaces that is smallest at the center and gradually increases outwardly until the transitional part (5) is reached, said brim part (6) having a thickness between its inner (12) and outer (13) surfaces that is largest where it adjoins the transitional part (5) and gradually decreases to the periphery, said transitional part (5) bveing formed by the combined larger-diameter outer convex surfaces of the central part (4) and transitional part (5) overlapping the central part inner surface (10), whereby a bitrifocal lens results.

2. An eye-contact lens as claimed in claim 1 wherein the width of the transitional part (5) measured radially is substantially uniform and has a value between 0.3 and 0.5 mm.

3. An eye-contact lens claimed in claim 1, wherein the reading add is cut into the outer surface (13) of the brim part and both inner surfaces of the brim (6) and transitional (5) parts.

* * * * *